United States Patent
McKee et al.

(10) Patent No.: US 8,060,731 B2
(45) Date of Patent: Nov. 15, 2011

(54) COMPUTER SYSTEM

(75) Inventors: Paul F McKee, Essex (GB); Sarah E Briggs, London (GB)

(73) Assignee: British Telecommunications plc, London (GB)

( * ) Notice: Subject to any disclaimer, the term of this patent is extended or adjusted under 35 U.S.C. 154(b) by 1308 days.

(21) Appl. No.: 10/552,474

(22) PCT Filed: Apr. 8, 2004

(86) PCT No.: PCT/GB2004/001583
§ 371 (c)(1),
(2), (4) Date: Oct. 7, 2005

(87) PCT Pub. No.: WO2004/092952
PCT Pub. Date: Oct. 28, 2004

(65) Prior Publication Data
US 2006/0218258 A1    Sep. 28, 2006

(30) Foreign Application Priority Data
Apr. 15, 2003  (GB) .................................. 0308708.7

(51) Int. Cl.
G06F 9/00       (2006.01)
G06F 9/24       (2006.01)
G06F 15/177     (2006.01)
(52) U.S. Cl. ..................... 713/1; 714/1; 714/2; 714/100
(58) Field of Classification Search .......... 713/1; 714/1, 714/2, 100
See application file for complete search history.

(56) References Cited

U.S. PATENT DOCUMENTS

| | | | | |
|---|---|---|---|---|
| 5,596,716 | A * | 1/1997 | Byers et al. | 714/48 |
| 5,764,882 | A * | 6/1998 | Shingo | 714/11 |
| 5,793,968 | A * | 8/1998 | Gregerson et al. | 709/209 |
| 6,134,679 | A | 10/2000 | Liddell et al. | |
| 6,167,431 | A | 12/2000 | Gillies et al. | |
| 6,430,687 | B1 * | 8/2002 | Aguilar et al. | 713/2 |
| 6,711,471 | B2 * | 3/2004 | Kidder | 700/276 |
| 6,862,263 | B1 * | 3/2005 | Simmons | 370/217 |
| 6,918,059 | B1 * | 7/2005 | Galuten et al. | 714/31 |
| 7,043,662 | B2 * | 5/2006 | Shiragaki | 714/4 |
| 7,065,641 | B2 * | 6/2006 | Schelling | 713/2 |
| 7,171,465 | B1 * | 1/2007 | Endo et al. | 709/224 |
| 7,197,552 | B2 * | 3/2007 | Zollner et al. | 709/223 |
| 7,290,177 | B2 * | 10/2007 | Kagawa | 714/39 |
| 7,298,695 | B1 * | 11/2007 | Cortez et al. | 370/218 |

(Continued)

OTHER PUBLICATIONS

International Search Report—Oct. 20, 2004.

(Continued)

*Primary Examiner* — Thomas Lee
*Assistant Examiner* — Jaweed A Abbaszadeh
(74) *Attorney, Agent, or Firm* — Nixon & Vanderhye PC (57) ABSTRACT

A computer system has a plurality of components which can be initialized. A plurality of components can be initialized and each component is configured to produce status data from which the level of need for that component to be initialized can be inferred. At least one component is configured to: receive status data from other components; make a comparison using the status data received from respective components; in dependence on the comparison, select one or more components for initialization; and, issue initialization instructions to the selected component(s). By making a comparison between the status data from different components, the relative need for different components to be initialized can be evaluated, allowing a component with a high need for initialization to be selected over a component with a lower need.

20 Claims, 6 Drawing Sheets

U.S. PATENT DOCUMENTS

| | | | |
|---|---|---|---|
| 7,350,063 B2* | 3/2008 | Schelling | 713/1 |
| 7,415,519 B2* | 8/2008 | Abbondanzio et al. | 709/226 |
| 7,581,223 B2* | 8/2009 | Harjula | 718/104 |
| 2002/0162045 A1* | 10/2002 | Shiragaki | 714/4 |
| 2003/0061535 A1 | 3/2003 | Bickel | |
| 2003/0120706 A1* | 6/2003 | Harjula | 709/104 |
| 2003/0163557 A1* | 8/2003 | Zollner et al. | 709/223 |
| 2003/0182021 A1* | 9/2003 | Kidder | 700/277 |
| 2003/0188146 A1* | 10/2003 | Hale et al. | 713/1 |
| 2003/0229775 A1* | 12/2003 | Schelling | 713/1 |
| 2004/0003082 A1* | 1/2004 | Abbondanzio et al. | 709/225 |
| 2004/0205382 A1* | 10/2004 | Noda et al. | 714/6 |
| 2005/0015657 A1* | 1/2005 | Sugiura et al. | 714/6 |

OTHER PUBLICATIONS

Huang et al., "Components for Software Fault Tolerance and Rejuvenation", Bell Labs Technical Journal, Wiley, CA, US, vol. 75, No. 2, Apr. 1, 1996, pp. 29-37.

Bianchini et al., "An Adaptive Distributed System-Level Diagnosis Algorithm and its Implementation", Proceedings of the International Symposium on Fault Tolerant Computing Montreal, Jun. 25-27, 1991, International Symposium on Fault Tolerant Computing Systems, (FTCS), Los Alamitos, IEEE Compt. Soc. Press, US, vol. Symp. 21, Jun. 25, 1991, pp. 222-229.

Wllman et al., "Auction Protocols for Decentralized Scheduling", Computer Science and Engineering University of Michigan, May 1998.

Hengartner et al., "ABDRA: Auction-Based Distributed Resource Allocation", Swiss Priority Programming for Information and Communications Structure, 1999.

Reynolds, Going . . . Going . . . Gone!, http://www.agorics.com/Library/Auctions/auction1.html Copyright © 1996, Agorics, Inc.

* cited by examiner

Fig. 5 III.

COMPUTER SYSTEM

This application is the US national phase of international application PCT/GB2004/001583 filed 8 Apr. 2004 which designated the U.S. and claims benefit of GB 0308708.7, dated 15 Apr. 2003, the entire content of which is hereby incorporated by reference.

BACKGROUND

1. Technical Field

This invention relates to a computer system, in particular to a computer system having a plurality of components which can be initialised.

2. Related Art

Despite advances in computer technology, the components of a computer system can have deficiencies which cause faults to develop over time. For example, many applications, such as those written in the language "C" contain memory leaks, wherein the application does not release memory after it has finished using it. Such faults can cause a component to hang or crash, thereby hindering the efficient operation of the system. It is know to cure or prevent a fault by initializing the faulty or potentially faulty component, for example by replacing at least some of the software from the component, by re-starting or re-booting the component, or by re-setting one or more control parameters of that component. However, the initialisation process will often disrupt the normal operation of the component, at least during the period in which initialisation is taking place. During this period, other components may be required to perform an additional number of tasks to compensate for the tasks that are not being performed by the disrupted component. Such a re-distribution of tasks may reduce the efficiency of the system as a whole.

BRIEF SUMMARY

According to one aspect of the present exemplary embodiment, there is provided a computer system having a plurality of components that can be initialized, wherein each component is configured to produce status data from which the level of need for that component to be initialized can be inferred, the status data having a predetermined level of need associable therewith and wherein at least one component is configured to: receive status data from other components; make a comparison using the status data received from respective components; in dependence on the comparison, select one or more components for initialization; and issue initialization instructions to the selected component(s).

By making a comparison between the status data from different components, the relative need for different components to be initialised can be evaluated, allowing a component with a high need for initialization to be selected over a component with a lower need. Thus, rather than considering in isolation whether a component needs to be initialised, the present invention allows the initialisation of components to be prioritized, thereby reducing the amount of disruption to the system as a whole.

The components may be hardware components, or alternatively, the components may be software components (e.g., a computer program contained in a computer-readable storage medium), running on at least one (hardware) computer device. In one embodiment, the components are software components each running on a respective computer device, the initialization of a component causing the device on which it runs to be re-booted or otherwise initialized.

The status data received from a component may include a plurality of status values, such as the amount of free memory in a memory location, the frequency with which a processor is accessing a memory location, or other historical or current data which can be used to determine the need for initialization of the component.

However, to simplify the processing to be carried out by a component receiving the status data, the status data will preferably be in the form of an initialization parameter. This will reduce the need for a component to evaluate and/or cross reference different data originating from the same component in order to infer the need for that component to be initialized. Furthermore, if the need for a component to be initialized can be expressed simply in terms of a variable, such as the elapsed time since the last initialization, the respective values of that variable for different components can be directly compared against one another.

The level of need for a component to be initialized can be positive or negative. Thus an initialization parameter may indicate the importance or urgency for a component to be initialized, but an initialization parameter may alternatively indicate the importance for a component not to be initialized, for example if that component is carrying out an essential task.

Preferably, each component will be configured to execute an initialization routine when the initialization parameter for that component reaches a threshold value, in which case that component will behave as an initializing component, sending a request message to other (recipient) components, the request message requesting respective initialization parameters from the recipient components. Hence, when the need for a component to be initialized becomes sufficiently high, that component can at least attempt to find out the need for other components to be initialized. This allows the amount of information which a component needs to retain about the state of other components to be reduced, since a component can when required obtain such information by transmitting a request message.

Furthermore, if each component can request initialization parameters from other components, the need for the initialization requirements of different components to be stored at a central location is reduced.

The threshold value for each component may be the same or different, and may be set by a system administrator in dependence on the importance or the number of tasks performed by a component.

The initialization routine carried out by an initializing component preferably includes the further steps of: comparing the initialization parameters received from other components with the initialization parameter for the initializing component; and, in dependence on the comparison, making a coif self-initialization decision. In this way, each component can take into account the need of other components to initialize before taking a wolf self-initialization decision.

In a preferred embodiment, each component is configured to select components for initialization, and to issue initialization instructions to the selected components. Thus, in this embodiment, even if one component is unable, due to a fault or otherwise, to act as an initiating component and select components for initialization, another component of the system will eventually be triggered to act as an initiating device (for example, because the time since the last initialization of that component has exceeded a threshold value). This fault tolerance will allow the system to maintain itself efficiently, since the task of selecting which components to initialize can in effect be distributed across the system.

The status data associable with a value of need data will preferably be predetermined such that the data arriving at a component from other components will have a level of need associable or associated therewith when it arrives. Thus, the association between status data and the need for initialization will preferably be predetermined such that it is possible to infer an indication of the level of need for a component to be initialized before a comparison is made between the status data from the different components. The comparison between the status data from different components can then be used to evaluate the relative need of two or more components to be initialized, relative to one another.

A receiving component may store a mapping or a functional relationship or other association between the values which status data can take on the one hand and levels of need on the other hand. For example association may simply be a one-to-one mapping between the level of need and values of status data, e.g., the higher the level of need, the greater the magnitude of the status data value. However, it will preferably be possible to after a relationship between the value of need and the status data, for example in response to a changing system environment. Thus (for any given relationship between status data and levels of need) the status data may be considered to be indicative of need.

Preferably, the status data will be able to take one or more values within a (possibly discrete) range of values. For example, the status data may take one (or more) of (at least) three values, indicative of high, medium or low initialization need. The status data from different components can then be at least partially ordered in dependence on (or accordance with) the relative value of the status data from at least some of the different components.

BRIEF DESCRIPTION OF THE DRAWINGS

The exemplary embodiment will now be further described, by way of example, with reference to the following drawings, in which.

DETAILED DESCRIPTION OF EXEMPLARY EMBODIMENTS

Figure 1:
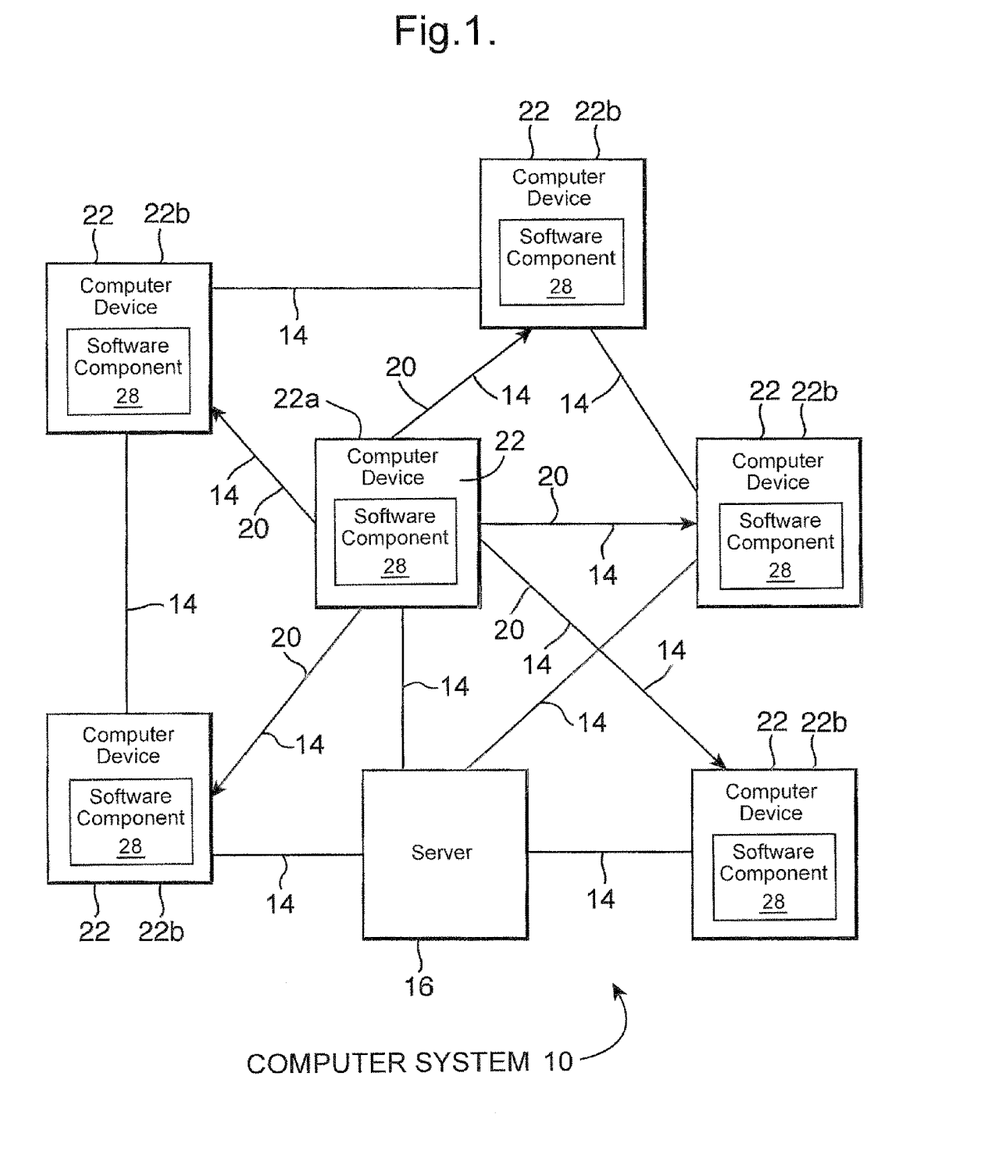
FIG. 1 shows schematically a computer system according to an exemplary embodiment.

In FIG. 1, there is shown a computer system 10 which includes a plurality of computer devices 22, each with a respective software component 18 running thereon, the computer devices being interconnected by a plurality of data links 14. Tasks or jobs are dynamically allocated to the respective computer devices 22 by a server 16, such that the tasks or jobs allocated to one computer device depend on the tasks or jobs being performed by at least some of the other computer devices. In this way, the computer system 10 as a whole can operate more efficiently than it would do in the absence of such coordination between the computer devices 22.

Each computer device is able to generate an initialization parameter that is indicative of the need (or equivalently the urgency or desirability) for the computer device 22 to be initialized. When the initialization parameter of a computer device 22 reaches a threshold value, that computer device acts as an initiating device 22a, and transmits a request message 20 over the data links 14 to the other computer devices 22, which devices then act as recipient devices 22b. The request message requests from the recipient devices 22b the current values of their respective initialization parameters.

The initiating device 22a is configured to compare the received initialization parameters from the recipient devices 22b together with its own initialization parameter and to issue initialization instructions to itself and/or one or more recipient device(s) 22b in dependence on the relative values of the initialization parameters. Because the initialization parameter of a computer device 22 is a measure of the need for that device to be initialized, the computer devices 22 most needing initialization can be selected in favor of computer devices least requiring initialization. Thus, those computer devices 22 which suffer disruption brought about by their initialization can be chosen so as to reduce the overall disruption to operation of the system 10.

In effect, the recipient devices 22b participate in an "auction", the initialization parameters representing "bids" for one or more available initialization instructions. The initiating device 22a can be viewed as an "auctioneer" device, allocating initialization instructions to the devices which place the highest bids: that is, those devices (including the initiating device) which are most in need of initialization. Although in this example the bids are "sealed", in that the bid placed by one device is independent of bids placed by other devices (and different devices can "bid" at the same time), alternative embodiments are possible where a feedback routine is executed by the devices participating in the auction, such that the bid placed by one device is dependent on bids placed by another device.

Figure 5:
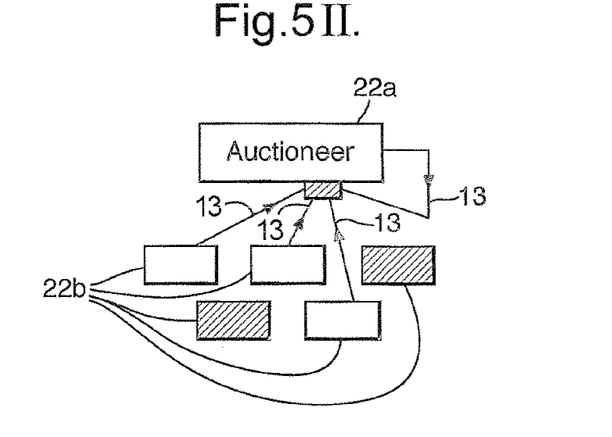
Figure 5I:
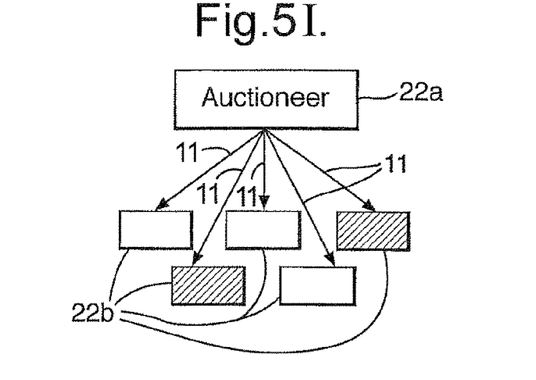
FIGS. 5I-III show schematically three stages involved in the selection of devices for initialization.

The "auction" procedure or protocol can be summarized with reference to FIGS. 5I-III in terms of three stages labeled I to III. In stage I, the initiating (auctioneer) device 22a announces its intention to hold an auction, by broadcasting a request message 11 to other recipient devices 22b. In stage II, devices not participating in another auction return bids 13 to the auctioneer device, whereas devices (indicated by shading) already participating in another auction with another auctioneer device (not shown) ignore the request message 11. The self-elected auctioneer device 22a also places a bid in its own auction. In stage III, after the auctioneer 22a has received and processed the bids, it informs the participants of the auction (non-shaded recipient devices 22b) of the "winning" devices which may be initialized (or equivalently another maintenance task can be initiated). To inform the participants, the auctioneer sends a message 15 to the participants, which message includes: the number of devices participating in the auction; the identity of the winning devices; and, the total number of devices participating in the auction.

Each computer device 22 may be housed in a respective housing or casing, the data links 14 being formed by cables which extend between the housings of the respective computer devices. In such a situation, the computer devices 22 may be situated in different geographical locations. Alternatively, the computer devices 22 may be located in a common housing and even, for example, on the same circuit board.

Figure 2:
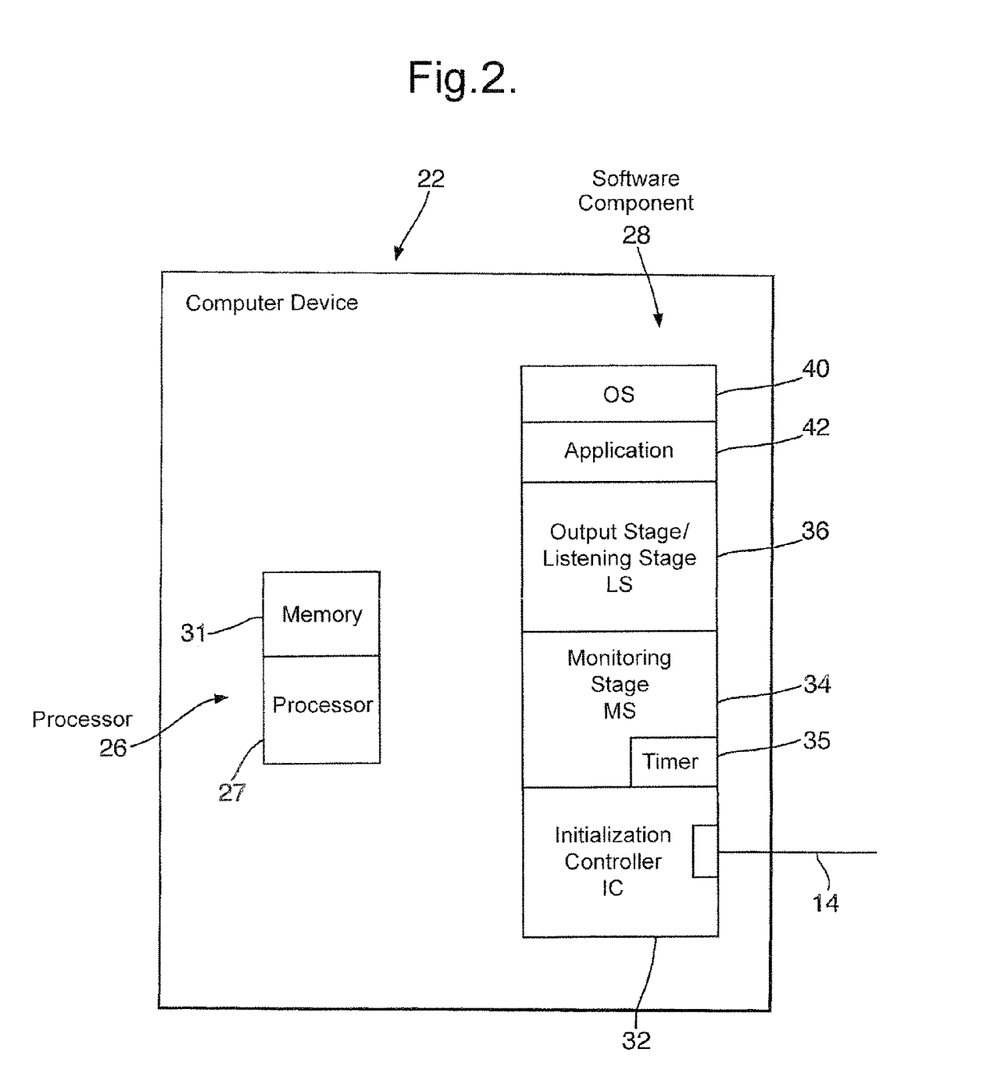
FIG. 2 shows a more detailed view of a computer device of FIG. 1.

A more detailed view of one of the computer devices 22 of FIG. 1 is shown in FIG. 2. The computer device 22 has a processor circuit 26 which includes a memory 31 and a processor 27 for respectively storing and executing the software component 28, as well as other software which may be running on the computer 22.

The software component 28 includes an operating system module 40 for controlling the operation of the computer device 22, and an application program 42 for performing tasks. A monitoring stage 34 is provided for monitoring one or more status indicators indicative of the likelihood of a fault or potential fault with the computer device 22, and for producing an initialization parameter in dependence on the monitored status data. The monitoring stage 34 may monitor the amount of memory space in the memory 31 that is deemed available by the operating system module 40. Thus, if the application program 42 fails to release all the memory it has finished using, this "leaky program" malfunction (or "bug") which could possibly lead to a fault can be monitored. When the amount of available memory drops below a threshold value, this can be classified by the monitoring stage as a fault or potential fault, and the monitoring stage can, in response to this fault or potential fault, issue an initialization parameter indicating a high need for the operating system module 40 and/or the application program 42 to be initialized.

However, in a preferred embodiment, the monitoring stage includes a timer 35 for measuring the elapsed time since the last initialization (preferably the time since the last initialization of the operating system module 40), the initialization parameter being representative of this elapsed time. It is appreciated that because computer devices are likely to behave in a non-ideal way due to malfunctions such as the "leaky program" malfunction, and because such malfunctions are likely to cause a deterioration in the operational capacity of a computer device over time, the elapsed time since the last initialization can provide a useful measure of the need for a computer device to be initialized.

The monitoring stage may take into account the tasks being performed by the device on which it is running, more important tasks having a greater weighting on the initialization parameter than tasks of a lesser importance. In one embodiment, the monitoring stage monitors whether the device on which it runs is performing one or more of a predetermined number of task, and will only issue a non-zero initialization parameter to the if such a task is not being performed.

The initialization may involve a re-boot (or equivalently a re-start) of the computer device 22, or alternatively the initialization may simply require the application program 42 to be killed and re-started, without re-booting the entire computer device 22. As a further alternative, the initialization may require the amount of memory deemed in use by the application program 42 to be re-set, for example, to zero.

Figure 3:
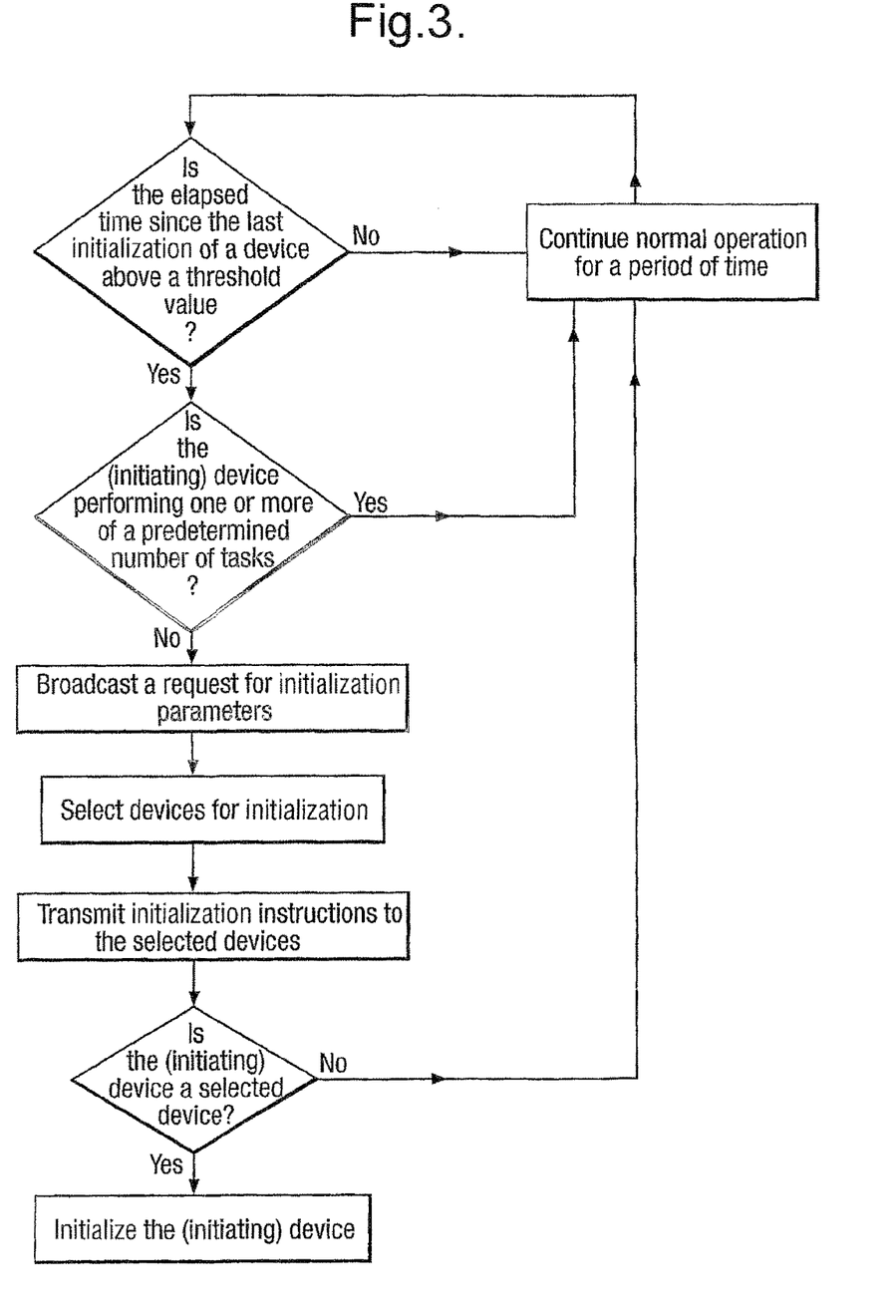
FIG. 3 is a flow chart showing steps carried out at an initiating device.

The initialization parameter generated by the monitoring stage 34 is passed to an initialization controller 32. The initialization controller 32 is configured to determine whether the initialization parameter (in this example, the elapsed time since the last initialization) from the monitoring stage 34 is above a threshold value. If the initialization parameter is above a threshold value, the computer device 22 then acts as an initiating device 22a as indicated in FIG. 3, and executes an initialization routine. In the initialization routine, the initialization controller 32 of the initiating device 22a transmits at an output stage 36 one or more requests for an initialization parameter to the other computer devices 22 (acting as recipient devices 22b).

The initiating device 22a need not know the identity of the recipient devices, nor need the initiating device know the number of existing recipient devices. Therefore, the request for initialization parameters from the initiating device 22a will preferably be sent in the form of a broadcast message, normally on a well-known port, and normally without being addressed to any specified recipient devices 22b. The request message will preferably contain: a time stamp indicating the time at which the message was sent; the name, address, and/or other label which identifies the initiating device 22a from which the request message originates; information indicative of a port number on which a reply with an initialization parameter should be sent; and a unique identifier for the request message.

Figure 4:
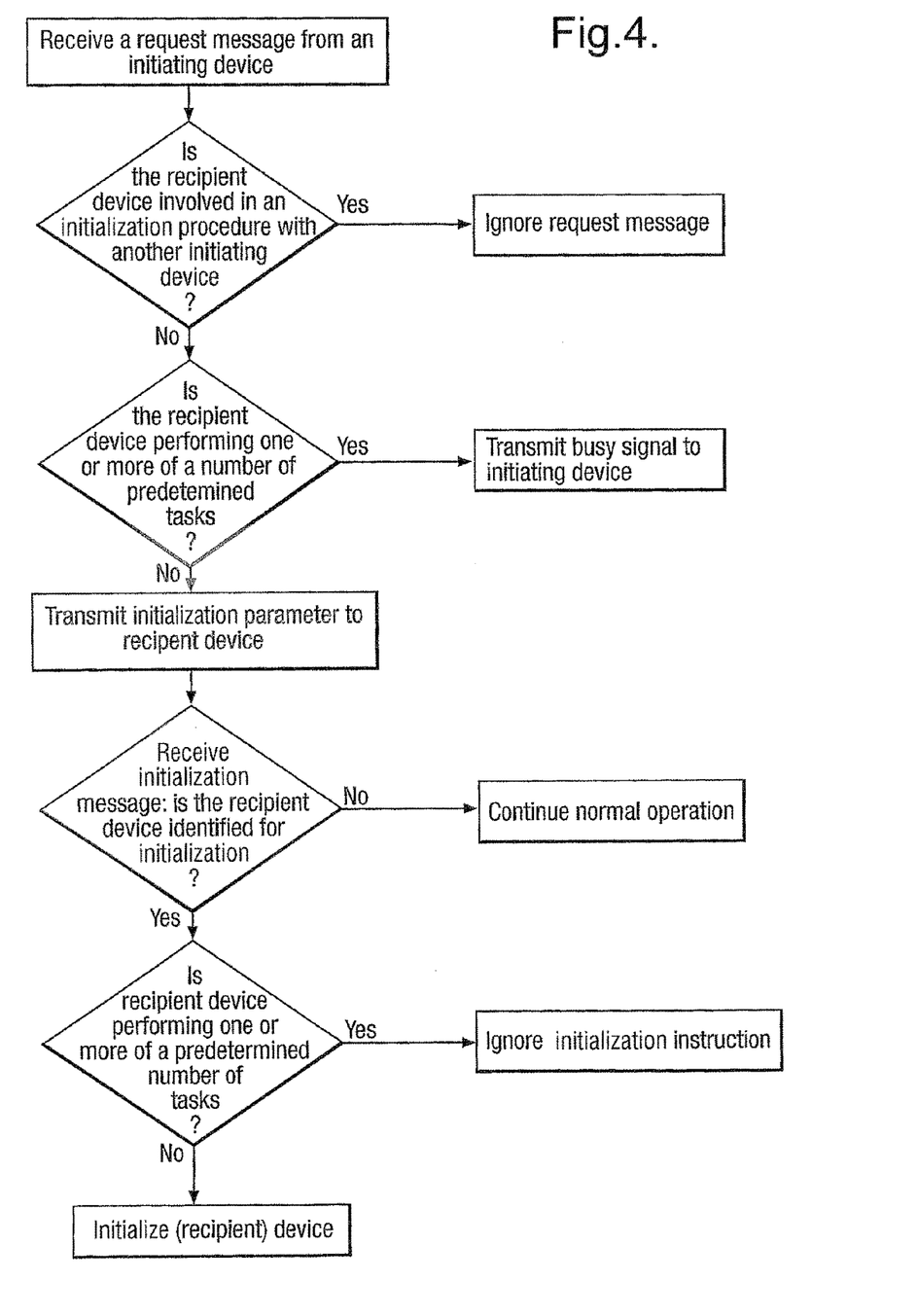
FIG. 4 is a flow chart showing steps carried out at a recipient device.

For each computer device 22, there is provided a listening stage 36 configured to monitor data arriving at that device 22, so as to detect if a request for an initialization parameter has been transmitted by another device 22 (the initiating device 22b), preferably on the chosen well-known port. When a request from an initiating device 22a is detected by the listening stage 36 of a recipient device 22b, the request is passed to the initialization controller 32 of that device, in response to which the initialization controller 32 executes a response routine (steps carried out by the recipient device 22b are shown in FIG. 4).

As part of the response routine, the initialization controller 32 of the recipient device 22b determines whether the recipient device 22b is involved in an initialization procedure with another initiating device. If so, the initialization controller 32 does not respond to the most recent request for an initialization parameter. Otherwise, the initialization controller 32 of the recipient device 22b will access status data or an initialization parameter from the monitoring stage 34 of that device. The monitoring stage 34 determines if the recipient device 22b is busy performing one of a number of tasks, and if so, passes a busy signal to the initialization controller 32. If the recipient device 22b is not busy, the monitoring stage 34 passes to the initialization controller 32 an initialization parameter indicative of the elapsed time since the last initialization at the recipient device 22b. The initialization controller 32 of the recipient device 22b then transmits the initialization parameter to the initiating device 22a, unless a busy signal is received from the monitoring stage 34, in which case the initialization controller 32 transmits the busy signal to the initiating device 22a in the form of an initialization parameter which indicates the elapsed time since the last initialization of the recipient device 22b is zero seconds. This busy signal will allow the initiating device 22a to treat the recipient device 22b as having the lowest possible priority for initialization.

The listening stage 36 of the initiating device 22a captures any initialization parameters received from recipient devices 22b in response to the request(s), and forwards these received initialization parameters to the initialization controller 32 of the initiating device 22a. The initialization controller 32 then performs a comparison step using the initialization parameters received from recipient devices 22b and the self-generated initialization parameter from the monitoring stage 34 of the initiating device 22a. The comparison step involves ranking at least some of the initialization parameters from different devices 22 in dependence on their respective magnitudes, and selecting a proportion (such as 10%) of the initialization parameters having the highest values. An initialization instruction is then sent to the respective computer devices 22 whose initialization parameter falls within that proportion. (If one of those initialization parameters used in the comparison steps originates from the initiating device 22b, the initialization controller 32 of the initiating device 22b will issue a self self-initialization instruction to the operating system module 40 and/or the application program 42 running on the initiating device. In this way, the devices 22 of the computer system 10 which most urgently require initialization can be selected.

The comparison step may also involve taking into account the total number of responses to the request message, as well as the number of idle devices (i.e., devices which return a non-zero value initialization parameter). Thus, 10% of idle devices may be selected for initialization.

The number or percentage of devices chosen for initialization may be set by an administrator or the server 16, and may depend on the predicted workload of the system (the workload may be predicted by analyzing historical patterns in the way in which the server 16 allocates tasks to the respective device, or by inspecting a log of tasks awaiting allocation by the server 16). By predicting the likely workload on the system, it is possible to estimate how many devices or what percentage of devices can be re-booted without endangering the operation of the system as a whole. In this way, the re-boot times of the devices 22 are coordinated so as to make it likely that at any one time, there will be enough working devices to handle job requests arriving at the system 10.

The initialization instructions from the initiating device 22a will preferably be sent as a common initialization message to the recipients devices 22b, such that the recipient devices 22b receive the same message. The initialization message will then contain information identifying which recipient devices 22b should be initialized, so that the initialization controller of identified recipient devices 22b can act on the initialization message. The initialization message will preferably also contain information indicating the number of recipient devices 22b from which an initialization parameter was received and the number of recipient devices 22b identified for initialization.

The initialization instruction for a recipient device 22b will preferably instruct the recipient device 22b to initialize a within a time period. However, before instigating an initialization, the initialization controller 32 of the recipient device 22b will interrogate the monitoring stage 33 to determine if the recipient device 22b is performing any of a number of tasks (and optionally whether the tasks(s) will be continued beyond the time period allowed for in the initialization request). If so, the recipient device 22b is deemed to be busy, and the initialization controller of the recipient device 22b ignores the initialization instruction. Optionally, the initialization controller 32 of the recipient device 22b can be configured to carry out an initialization in response to the initialization instruction if the elapsed time since the last initialization exceeds a threshold value, regardless of whether the recipient device 22b is busy or idle.

Figure 6:
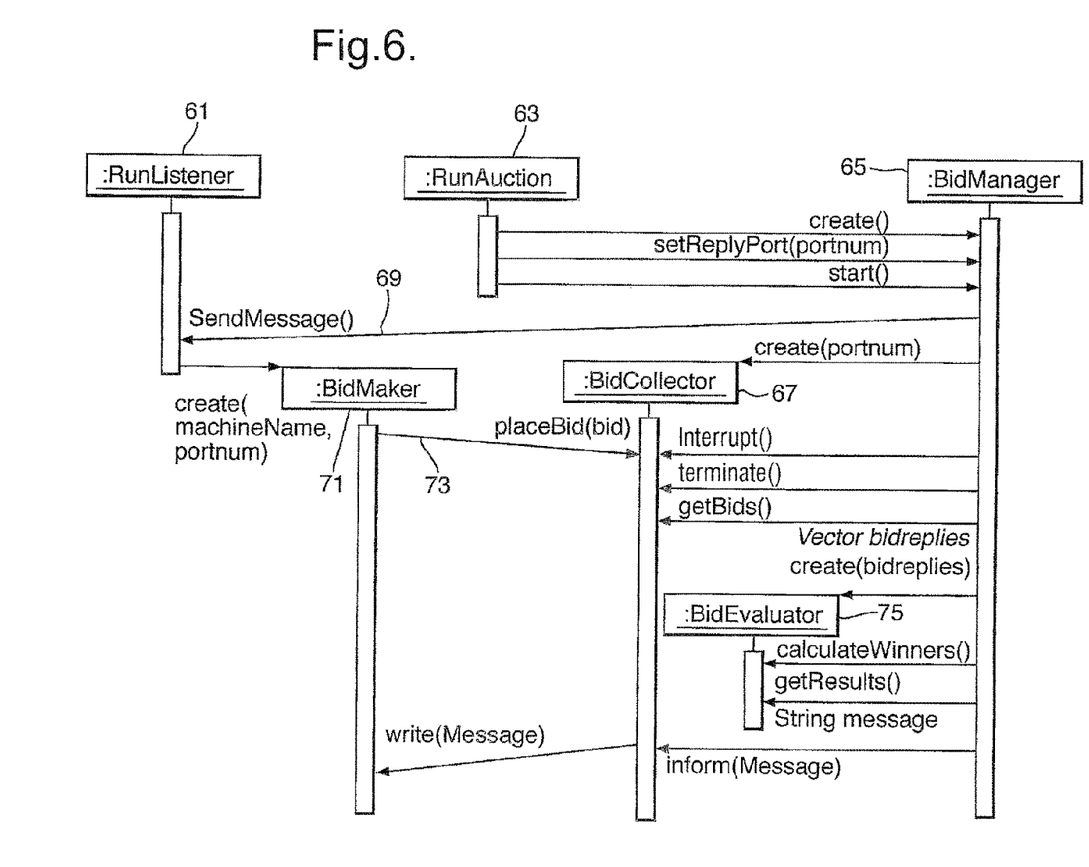
FIG. 6 is a UML sequence diagram illustrating the communication and relationship between objects in the computer system.

In FIG. 6, there is shown a UML sequence diagram illustrating the communication and relationship between software objects in the computer system (each object or process is represented as a box in FIG. 6). Each device 22 that can potentially take part in the auction runs a listening process 61 indicated by the RunListener time line. This process waits for communication from other devices. When a device has reached the threshold necessary to hold an auction, a process 63 indicated by the RunAuction time line starts. This RunAuction process 63 creates a BidManager process 65 and informs it which communication port to use. The BidManager process 65 creates a BidCollector process 67 and passes it details of the communications port on which to receive bids. The BidManager process 65 contacts the RunListener running in each device by sending a message 69. When the RunListener process 61 of a device 22 receives such a message 69, it creates a BidMaker process 71 for that device supplying device name and communications port number. The BidMaker process 71 sends a placeBid message 73 to the BidCollector 67. The BidManager also creates a BidEvaluator process 75 which calculates the winning bids i.e., which selects devices for initialization. Winners (i.e., devices selected for initialization) are informed via the BidCollector process and the BidMaker process. The sequence shown in FIG. 6 is preferably implemented using (or written in) the "Java" language.

The embodiment described above is suitable for a collection of computers. Because the protocol in this embodiment does not need to know the membership details of the collection it is able to continue to work in the face of partition of the collection. As an example of this, if we consider 2 islands of computers, for example 50 in each, linked by a network connection into a single pool where the "auction protocol" of the invention is active, scheduling of maintenance or initialization will take place as and when required. Should the network connection fail, each island can continue scheduling maintenance within itself, until the connection is restored when the whole pool can participate again.

In another embodiment (not shown), the software components 28 run on a common computer device under the control of a common operating system. An example of this is a server running different programs for different users. In such a situation, the software components 28 will not normally include the operating system, such that the operating system can continue to run even when one or more of the components 28 are initialized.

As can be seen from the above description, the present invention will be particularly useful in a system having components which work together as a group and which each require initialization at time intervals, allowing components to initialized without excessively disturbing the group dynamics of the system.

What is claimed is:

1. A computer system comprising:
   a plurality of components that can be initialized, each component being operable to perform at least one task when not being initialized, but disrupting performance of said at least one task when being initialized,
   wherein each component is configured to produce status data from which the current level of need for that component to be initialized can be inferred, the status data representing a predetermined current level of need for that component to be initialized, and
   wherein at least one of said components is itself also configured to:
      receive status data from other components;
      make a comparison using its own status data and the status data received from respective other components;
      in dependence on the comparison, select one or more of said components, possibly itself, for initialization; and
      issue initialization instructions to the selected component(s).

2. A computer system as claimed in claim 1, wherein each component configured to make a comparison using status data is configured to use its own status data in addition to received status data when making the comparison.

3. A computer system as claimed in claim 1, wherein the components are software components, and wherein the system includes at least one computer device on which, in use, the software components are run.

4. A computer system as claimed in claim 1, wherein the status data is in the form of an initialization parameter, 5. A computer system as claimed in claim 4, wherein:
   each component is configured to execute an initialization routine when the initialization parameter for that component reaches a respective threshold value, the initialization routine including the step of transmitting a request for an initialization parameter to other components.

6. A computer system as claimed in claim 5, wherein the initialization routine includes the further steps of:
receiving initialization parameters from at least some of those other components;
comparing the received initialization parameters with the initialization parameter for that component; and
in dependence on the comparison, making a self-initialization decision.

7. A computer system as claimed in claim 4, wherein:
each component includes a timer module for registering elapsed time since previous initialization of that component, and
for each component, the initialization parameter is determined at least in part in dependence on the elapsed time registered by the timer module.

8. A computer system as claimed in claim 4, wherein each component is configured to produce an initialization parameter that is at least in part dependent on whether the component is performing one of a number of predetermined tasks.

9. A computer system as claimed in claim 3, wherein the computer system includes a plurality of interconnected computer devices, each of which is housed in a respective housing, and wherein each device has, in use, a respective software component running thereon.

10. A computer system as claimed in claim 9, wherein the software components each include a respective operating system module for operating the computer device on which the respective software component is running.

11. A computer system as claimed in claim 9, wherein each component is configured to initiate a re-boot routine upon receipt of an initialization instruction, the re-boot routine being configured to re-boot the computer device on which the software component is running.

12. A computer system as claimed in claim 11, wherein the re-boot routine includes the step of determining if the computer device is performing a predetermined task or one of a number of predetermined tasks, and only to permit the re-booting of the computer device if the computer device is not performing such a task.

13. A computer system as claimed in claim 3, wherein the components in use run on a common computer device, under the control of a common operating system.

14. A computer system as claimed in claim 3, wherein each component, upon receipt of an initialization instruction, is configured such that the component is killed and subsequently restarted.

15. A computer system as claimed in claim 1, including a computer device configured to allocate tasks to the components, such that a task allocated to one component is dependent on the task or tasks being performed by at least some of the other components.

16. A computer system as in claim 1, wherein said status data is fault-related.

17. A method of initializing the components of a computer system, the computer system having a plurality of components that can be initialized, each component being operable to perform at least one task when not being initialized, but disrupting performance of said at least one task when being initialized, each component being configured to produce status data from which the current level of need for that component to be initialized can be inferred, the method comprising at least one of said components performing the steps of:
receiving status data from other of said components;
making a comparison between the status data for all said components including status data received from respective components and its own status data;
in dependence on the comparison, selecting one or more components, possibly itself, for initialization; and
issuing initialization instructions to the selected component(s).

18. A computer system comprising:
a plurality of components that can be initialized, each component being operable to perform at least one task when not being initialized, but disrupting performance of said at least one task when being initialized,
wherein each component is configured to produce status data from which the current level of need for that component to be initialized can be inferred, and
wherein at least one of said components is configured to:
receive status data from said other components;
make a comparison using its own status data and the status data received from respective said other components;
in dependence on the comparison, select one or more components, possibly itself, for initialization; and
issue initialization instructions to the selected component(s).

19. A method of initializing the components of a computer system, each component being operable to perform at least one task when not being initialized, but disrupting performance of said at least one task when being initialized, the method comprising:
using status data from itself and a plurality of other of said components to determine for each said component, the current need for that component to be initialized relative to the need for at least one other of said components to be initialized; and
initializing at least one of the components in dependence on its so determined relative need.

20. A method as in claim 19, wherein said status data is fault-related.

* * * * *